United States Patent
Gaither et al.

(10) Patent No.: US 6,611,926 B1
(45) Date of Patent: Aug. 26, 2003

(54) MECHANISMS TO SAMPLE SHARED-DIRTY-LINE ADDRESSES

(75) Inventors: Blaine D. Gaither, Fort Collins, CO (US); Donna Ott, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/450,826

(22) Filed: Nov. 29, 1999

(51) Int. Cl.[7] .................................................. H02H 3/05
(52) U.S. Cl. ........................ 714/39; 711/154; 717/104
(58) Field of Search ................................ 711/121, 137, 711/147, 148, 153, 154; 714/39; 717/104

(56) References Cited

U.S. PATENT DOCUMENTS

| | | | | |
|---|---|---|---|---|
| 4,367,525 A | * | 1/1983 | Brown et al. ................. | 710/18 |
| 4,435,759 A | * | 3/1984 | Baum et al. ................. | 714/44 |
| 4,829,370 A | * | 5/1989 | Mayne et al. ................ | 348/588 |
| 5,193,179 A | * | 3/1993 | Laprade et al. ............... | 714/47 |
| 5,426,741 A | * | 6/1995 | Butts et al. ................... | 710/18 |
| 5,440,722 A | * | 8/1995 | VanderSpek et al. ......... | 714/38 |
| 5,574,860 A | * | 11/1996 | Perlman et al. ............. | 340/5.74 |
| 5,621,898 A | * | 4/1997 | Wooten ....................... | 370/462 |
| 5,848,237 A | * | 12/1998 | Cross et al. .................. | 714/34 |
| 6,023,199 A | * | 2/2000 | Cheung ....................... | 327/172 |
| 6,049,798 A | * | 4/2000 | Bishop et al. ................. | 707/10 |
| 6,049,861 A | * | 4/2000 | Bird et al. .................... | 712/21 |

* cited by examiner

*Primary Examiner*—Hiep T. Nguyen

(57) ABSTRACT

A device and method for collecting data on which lines are being shared in a multiprocessor system having cache memories is described. In the present invention, a sample arm register observes a local channel, such as a bus, for key events. Upon waiting a certain number of events, the sample arm register arms a sample register. Once armed the sample register will latch the next qualified address of the data being collected. The sampled data is then stored in memory. Post processing software will read the data from memory. The samples are then analyzed to correlate them with such things as locations and data structures in the system. This helps dynamically optimize the work load to reduce shared dirty line traffic.

14 Claims, 2 Drawing Sheets

MECHANISMS TO SAMPLE SHARED-DIRTY-LINE ADDRESSES

TECHNICAL FIELD

This invention relates generally to digital computer memory systems and more specifically to collecting data on which lines are being shared in a multiprocessor computing system having cache memories.

BACKGROUND ART

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a relatively small fast memory called a cache, either physically integrated within a processor integrated circuit or mounted physically close to the processor for speed. There may be separate instruction caches and data caches. There may be multiple levels of caches. While the present patent document is applicable to any cache memory system, the document is particularly applicable to large caches, for example a cache for a multiprocessor systems having at least two levels of cache with the largest caches having a capacity of at least tens of megabytes.

The goal of a memory hierarchy is to reduce the average memory access time. A memory hierarchy is cost effective only if a high percentage of items requested from memory are present in the highest levels of the hierarchy (the levels with the shortest latency) when requested. If a processor requests an item from a cache and the item is present in the cache, the event is called a cache hit. If a processor requests an item from a cache and the item is not present in the cache, the event is called a cache miss. In the event of a cache miss, the requested item is retrieved from a lower level (longer latency) of the memory hierarchy. This may have a significant impact on performance.

Ideally, an item is placed in the cache only if it is likely to be referenced again soon. Items having this property are said to have locality. Items having little or no reuse "pollute" a cache and ideally should never be placed in a cache. There are two types of locality, temporal and spatial. Temporal locality means that once an item is referenced, the very same item is likely to be referenced again soon. Spatial locality means that items having addresses near the address of a recently referenced item are likely to be referenced soon. For example, sequential data streams and sequential instruction streams typically have high spatial locality and little temporal locality. Since data streams often have a mixture of temporal and spatial locality, performance may be reduced because sections of the data stream that are inherently random or sequential can flush items out of the cache that are better candidates for long term reference. Typically, the minimum amount of memory that can be transferred between a cache and a next lower level of the memory hierarchy is called a line, or sometimes a block or page. Typically, spatial locality is accommodated by increasing the size of the unit of transfer (line, block, page). In addition, if a data stream is sequential in nature, prefetching can also be used. There are practical limits to the size of cache lines, and prefetching can flush lines that may soon be reused from the cache.

A large cache or a particular cache configuration may or may not be cost effective. In general, cache memory systems are expensive. In addition to the basic memory involved (which is usually the fastest, most expensive memory available), an extensive amount of overhead logic is required for determining whether there is a cache hit. For multi-processor systems, additional overhead logic is required to ensure that every copy of a particular memory location shared between multiple cache memories is consistent (called cache coherency). For a large cache, the associated overhead logic may add delay such as, sharing traffic. Finally, there is the issue of locality.

Modern Symmetric Multiprocessing (SMP) operating systems and applications attempt to reduce the sharing of data between processors by many approaches including forcing processes and threads to run on specific, individual processors. In order to design the most efficient and highest throughput interconnect SMP hardware as well as OS software, data about memory transactions, processor affinity, cache miss rates and explicit details about sharing traffic is required. However, typically, the only data generally available to OS and application engineers is the cache miss rate and perhaps the total amount of sharing traffic.

A common problem in system design is to evaluate sharing behavior on real systems. The present invention collects data on exactly which lines are being shared and provides it to the operating system with little artifact. This is significant because it allows for a more accurate characterization of the sharing behavior on real systems.

SUMMARY OF INVENTION

This invention collects data on exactly which lines are being shared and provides it to the operating system with little artifact. This allows for a more accurate characterization of the sharing behavior on real systems. Once OS and applications programmers know the address of the line containing data being shared, they can more efficiently identify and cure excessive sharing problems. Similarly, this scheme enables dynamic application tuning software to know which data is being shared. By knowing which data is being shared, the software can then determine which threads are sharing the data and endeavor to manipulate system tuning controls to assure that threads sharing the data are running on the same CPU. In a NUMA or ccNUMA computer software can use the information gathered by this instrumentation scheme to identify which data is being referenced and attempt to migrate the data to a memory location closer to the user of the data.

According to a method of the present invention, a sample arm register observes a local channel, such as a bus, for key events. Upon waiting a certain number of events, the sample arm register arms a sample register. Once armed the sample register will latch the next qualified address of the data being collected. The sampled data is then stored in memory. Post processing software will read the data from memory. The samples are then analyzed to correlate them with such things as locations and data structures in the system. This helps dynamically optimize the work load to reduce shared dirty line traffic.

DETAILED DESCRIPTION OF PREFERRED EMBODIMENT

Figure 1:
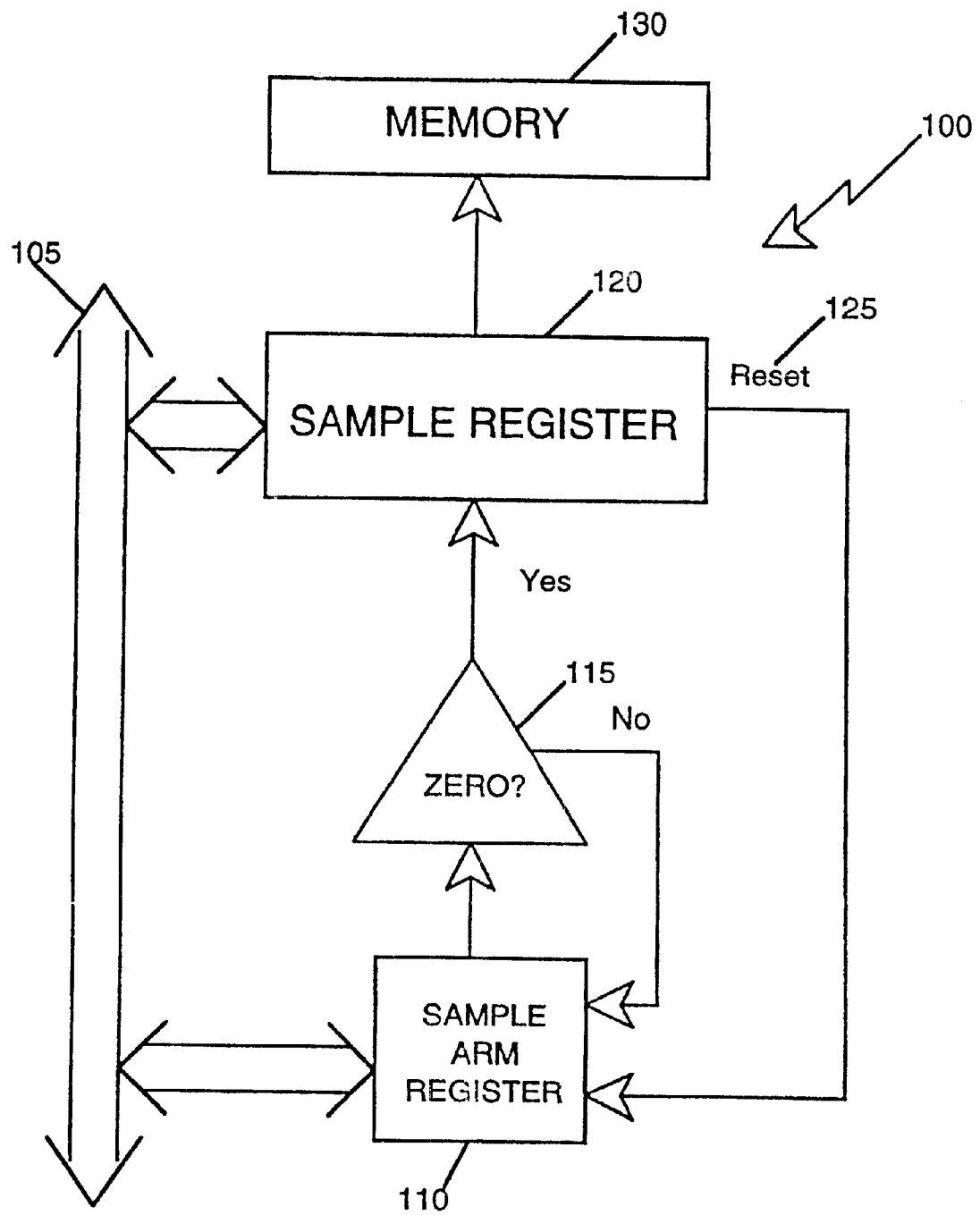
FIG. 1 is a block diagram of an example embodiment of a system in accordance with the invention.

FIG. 1 is a block diagram of a sampling mechanism 100 for collecting a sample of dirty lines. A computer bus 105 carries memory transactions, including addresses and. transaction types (for example, load, store, invalidate). Although the bus 105 is illustrated as a bus, a bus is exemplary of any channel interconnecting major system elements. Attached to the bus 105 is a sample arm register 110. The sample arm register 110 observes the bus 105 for key events. Key events can be timer ticks or any other event. While observing the bus 105, the sample arm register 110 decrements toward zero 115 on observing each key event. The sample arm register 110, maybe a down counter, however, the down counter is just one example of a mechanism to skip a period of time. If the counter is not zero, the sample arm register 110 continues to decrement on each key event. If the counter is zero 115, the sample arm register 110 arms the sample register 120. Once the sample register 120 is armed, the sample register 120 will latch the next qualified event from the bus 105. A qualified event can be any event the sampling mechanism wants to sample. For example, if the sampling mechanism 100 wants to evaluate sharing behavior on real systems, the present invention would collect data on exactly which lines are being shared, known as HITM (hit modified).

Upon arming the sample register 120, the sample arm register 110 is reset 125. The sample register 120 passes the latched sample to a memory 130. The sampling mechanism 100 could arm the sample register 120 on every $n^{th}$ dirty line on the bus or wait a fixed period of time before arming the sample register 120.

Alternatively, the sample arm register 110 might continue to down count into negative values, but not wrap around to a positive value. The down counter would freeze when the sample was taken giving the user a count of the number of bus transactions that transpired before the value was latched.The The sample arm register 110 attempts to allow samples taken to appear randomly drawn as opposed to, for example, latching on to every line encountered. In particular, the sample arm register 110 delays arming of the sample register 120 until either a fixed period of time or a variable count from when the sampling mechanism 100 is actually invoked. The sample arm register 110 gives the system a way to push itself out far enough in time from the invocation of a sampling routine to when the qualified address is latched to avoid correlation with other system events, such as artifacts of the sampling routine itself. Since the effects of the sampling routine may effect the bus for some period of time, the sample arm register 110 prevents the sample register 120 from arming until the effects of the sample routine have cleared the bus. This is to avoid auto correlations between the sample taken (HITM) and the code (sample routine) that is invoking the sample. Thus, the computer skips some events, either in time or an event, to attempt to put the computer at a point when what it is observing on the bus is no longer correlated with the invocation of the sampling routine to take the sample.

Therefore, the present invention collects data on exactly which lines are being shared and provides it to the operating system with little artifact. This allows for a more accurate characterization of the sharing behavior on real systems. Once OS and applications programmers know the address of the line containing data being shared, they can more efficiently identify and cure excessive sharing problems. Similarly, this scheme enables dynamic application tuning software to know which data is being shared. This software can then determine which threads are sharing the data and endeavor to manipulate system tuning controls to assure that threads sharing the data are running on the same CPU. In a NUMA or ccNUMA computer software can use the information gathered by this instrumentation scheme to identify which data is being referenced and attempt to migrate the data to a memory location closer to the user of the data.

Figure 2:
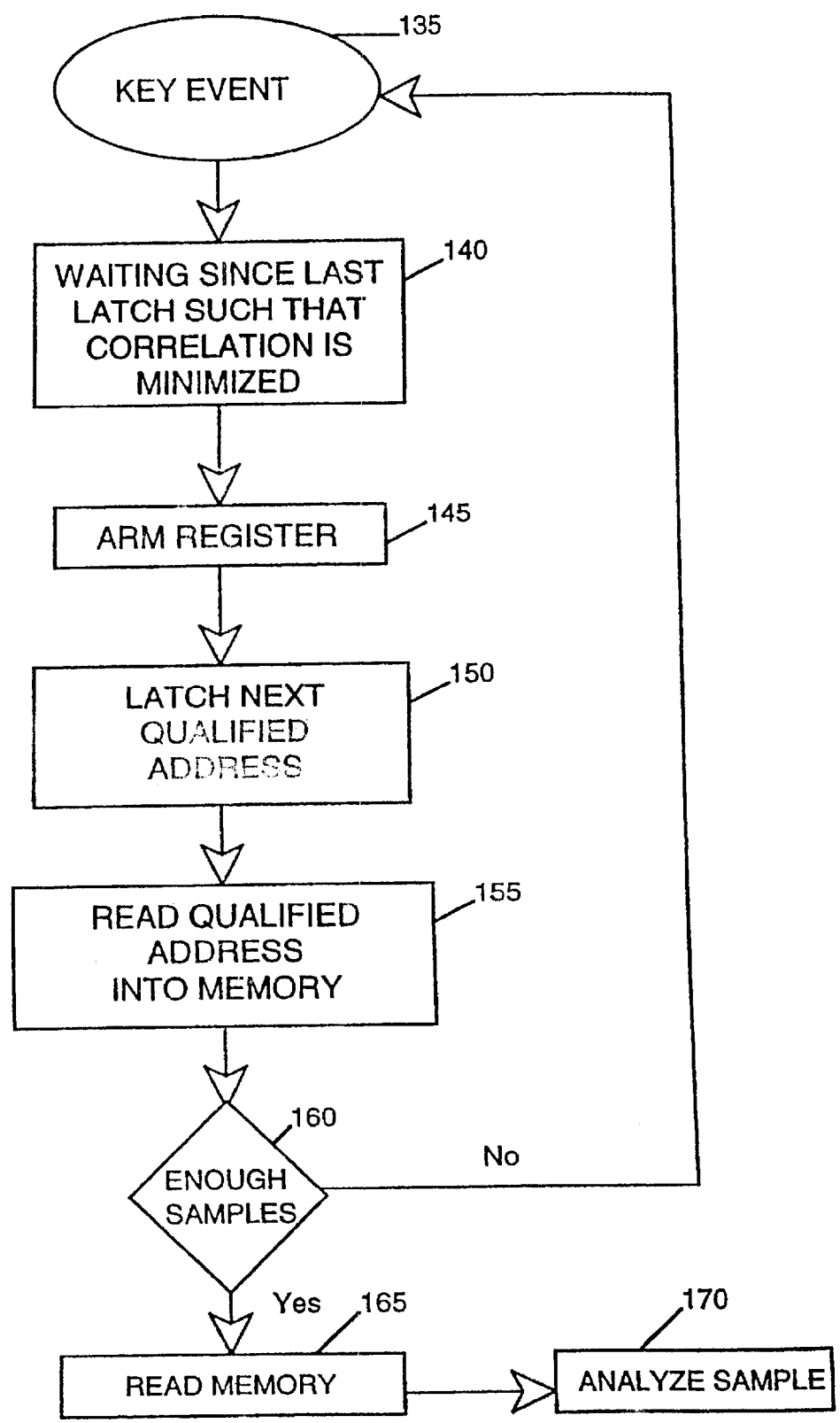
FIG. 2 is a flow chart for use of the system of FIG. 1.

FIG. 2 is a flowchart of a sampling method for the sampling mechanism 100. The flowchart illustrates the method in reference to the following example: Assume that processor A requests data from memory, and the up-to-date copy of that data is not in memory, but in the cache of another processor B, said to be a "dirty line" in processor B's cache. Processor B must forward the up-to-date (dirty-line) data to processor A.

There are many cache coherency protocols, MSI, MESI, and MOESI, that are used to enforce cache coherency between several processors so that the processors all see the same (coherent) view of the contents of main memory. In order to maintain coherency, these protocols require that processor B forward the dirty line data to processor A, as in the example illustrated above.

The sample arm register 110 observes the bus 105 for key events (step 135). Once the sample arm register 110 counts/waits a certain number of events (step 140) it arms the sample register 120 (step 145). Once armed, the sample register 120 will latch the next qualified address (step 150). Thus, the sample register 120 will latch, at most, one sample per setting of the sample arm register 110.

Once the sample is obtained by the sample register 120, software, firmware or hardware will take the sample out of the sample register 120, store the sample in memory 130 (step 155) and wait a period of time before disarming the sample arm register 10. Post processing software will determine if enough samples have been taken (step 160) and will then read the samples from memory (step 165). The samples are analyzed (step 170) to correlate them with such things as locations and data structures in the system so that a running operating system might notice getting modified hits on x memory location line. The software can then evaluate what properties can reference that line and try and make them run on the same processor so that no hits occur. This helps to dynamically optimize the work load to reduce shared dirty line traffic.

The present invention also provides a snapshot of where various symbolic data is allocated in physical or virtual memory. Software in the sampling mechanism 100 produces a table that maps the symbolic names (names known to the programmer) of the data to physical or (if the interconnect is virtually addressed) virtual address. The table can be used to associate observed (sampled) interconnect transactions with the symbolic names of data structures. For sharing problems, this allows the programmer to concentrate his/her optimization efforts on the data that is most often shared on the interconnect, rather than having to guess about what structures are being shared as is the case today with instrumentation that only produce counts, of accesses.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
   monitoring events on a channel;
   counting for a period of time;
   capturing a next qualified address from the channel;
   storing captured qualified addresses;
   analyzing the stored qualified addresses to correlate the qualified addresses to locations and data structures in a computer system, wherein the computer system observes cache hits on a memory location line;

evaluating references of the memory location line; and running the memory location line on the computer system, wherein workload is optimized and shared dirty line traffic is reduced.

2. The method of claim 1, wherein a first register monitors the channel.

3. The method of claim 1, wherein a first register counts for said period of time.

4. The method of claim 1, further comprising: arming a second register upon expiration of the period of time.

5. The method of claim 1, wherein the step of counting enables a sampling routine of the computer system to avoid correlation with other system events.

6. The method of claim 1, further comprising:

repeating all steps multiple times.

7. The method of claim 1, further comprising:

disarming a first register upon capturing the next qualified address.

8. A computer system comprising:

a channel;

a first register connected to the channel;

a second register connected to the first register and the channel, wherein said second register latches a sample from the channel; and a memory connected to said second register, wherein said memory stores the sample, wherein the computer system analyzes the stored sample to correlate the qualified addresses to locations and data structures in the system, wherein the computer system observes cache hits on a memory location line and evaluates references of the memory location line, and wherein the memory location line is run on the computer system to optimize workload and to reduce shared dirty line traffic.

9. The computer system of claim 8, wherein said first register observes the channel for key events.

10. The computer system of claim 9, wherein said key events are timer ticks.

11. The computer system of claim 8, wherein said first register is a timer.

12. The computer system of claim 11, wherein said first register counts for a period of time prior to arming the second register.

13. The computer system of claim 8, wherein said sample is a hit modified line.

14. The computer system of claim 11, wherein said first register allows the system to avoid correlation between the latched sample and a routine that invoked the sample by waiting for a period of time prior to arming the second register.

* * * * *